(12) United States Patent
Cheung et al.

(10) Patent No.: US 10,348,851 B1
(45) Date of Patent: Jul. 9, 2019

(54) PROXY SERVER STREAMING A RESOURCE TO MULTIPLE REQUESTING CLIENT DEVICES WHILE THE RESOURCE IS BEING RECEIVED AT THE PROXY SERVER

(71) Applicant: CLOUDFLARE, INC., San Francisco, CA (US)

(72) Inventors: Ka-Hing Cheung, San Francisco, CA (US); Jonathan Philip Levine, San Francisco, CA (US); Robert Alan Mitchell Burke, San Francisco, CA (US)

(73) Assignee: CLOUDFLARE, INC., San Francisco, CA (US)

( * ) Notice: Subject to any disclaimer, the term of this patent is extended or adjusted under 35 U.S.C. 154(b) by 0 days.

(21) Appl. No.: 16/207,034

(22) Filed: Nov. 30, 2018

(51) Int. Cl.
*G06F 15/16* (2006.01)
*H04L 29/08* (2006.01)
*H04L 29/06* (2006.01)
*G06F 16/172* (2019.01)

(52) U.S. Cl.
CPC ........ *H04L 67/2842* (2013.01); *G06F 16/172* (2019.01); *H04L 65/60* (2013.01); *H04L 67/327* (2013.01)

(58) Field of Classification Search
CPC ... H04L 67/2842; H04L 67/327; H04L 65/60; G06F 16/172

USPC .......................................................... 709/229
See application file for complete search history.

(56) References Cited

U.S. PATENT DOCUMENTS

| | | | | |
|---|---|---|---|---|
| 5,809,527 | A * | 9/1998 | Cooper | G06F 12/0866 707/999.2 |
| 7,024,472 | B1 * | 4/2006 | Datta | H04L 67/2823 709/223 |
| 2002/0147827 | A1 * | 10/2002 | Breiter | H04L 29/06 709/231 |
| 2016/0337426 | A1 * | 11/2016 | Shribman | H04L 65/4084 |

* cited by examiner

*Primary Examiner* — Frantz B Jean
(74) *Attorney, Agent, or Firm* — Nicholson De Vos Webster & Elliott LLP (57) ABSTRACT

A first server receives a request for a file from a first client device. The first server determines that the file is not fully available in a cache that is available to the first server and receives at least a portion of the file from a second server. While the file is being received, the first server writes data of the file to a temporary cache file as it is being received; streams the file to the first client device from the temporary cache file; receives a request for the file from a second client device; and streams the file to the second client device from the temporary cache file without waiting for the requested file to be fully received at the first server and without transmitting an additional request for the file to the second server.

21 Claims, 4 Drawing Sheets

PROXY SERVER STREAMING A RESOURCE TO MULTIPLE REQUESTING CLIENT DEVICES WHILE THE RESOURCE IS BEING RECEIVED AT THE PROXY SERVER

FIELD

Embodiments of the invention relate to the field of network computing; and more specifically, to a proxy server streaming a resource to multiple requesting client devices while the resource is being received at the proxy server is described.

BACKGROUND

Content delivery networks (CDNs) allow resources to be delivered to client devices quicker and cheaper than traditional client/server technology. A CDN includes multiple servers that are typically geographically distributed that can store and serve files of an origin server. A CDN server may be physically closer to the requesting client than the origin server. This has several advantages including reducing the time for the client to receive the resource, reducing the bandwidth of the origin server, and reducing other processing resources of the origin server.

CDNs typically operate as either a "push" CDN or a "pull" CDN. In a push CDN, the resources are first "pushed" to the CDN servers before they are requested. When requested, the CDN server can respond to the request from its storage instead of querying the origin server. In a "pull" CDN, the resources are received at the server dynamically when requested. For instance, upon the first client making a request for a resource that is not available at the CDN server, that CDN server typically "pulls" the resource from the origin server (it typically sends a request for the resource to the origin server and receives the resource from the origin server in response). Subsequent requests for the resource can be retrieved by the CDN through its cache instead of querying the origin server.

Many CDN servers use a multi-process architecture with many CPUs on the same machine. These processes (sometimes referred as "worker" processes) minimally coordinate with each other so that they can largely run independently taking advantage of the many CPUs of the server. However, if there is an uncached resource, the first request that fetches the resource is handled by a first worker process and subsequent requests that fetch the resource may be handled by different worker processes. Different worker processes conventionally do not share data buffers.

The CDN server can stream the response received from the origin server to the initial requesting client instead of waiting for the entire resource to be received. However, if another request is received for the same resource before the entire resource is received, the CDN server would conventionally either transmit an additional request to the origin server or set a lock in cache to wait until the resource is fully received or timeout (if timed out, the CDN server would make an additional request to the origin server). If the requested resource is large (e.g., greater than 500 MB), the cache lock timeout can be easily hit thereby causing more requests to be sent to the origin server which takes up further origin bandwidth further exacerbating the problem and also increasing latency to the requesting client.

BRIEF DESCRIPTION OF THE DRAWINGS

The invention may best be understood by referring to the following description and accompanying drawings that are used to illustrate embodiments of the invention. In the drawings.

DESCRIPTION OF EMBODIMENTS

A method and apparatus for a proxy server streaming a resource to multiple requesting client devices while the resource is being received at the proxy server is described. The proxy server has a multi-process architecture where different requests may be handled by different processes and potentially on different CPUs. The proxy server receives a request for a file from a first client device. The request may be, for an example, an HTTP/S request for a relatively large file (e.g., greater than 500 MB). For instance, the large file could be a large binary file such as a video game or other software where the full file is needed. The proxy server determines that the file is not fully available in a cache that is available to the proxy server. The proxy server transmits a request for the file to another server (e.g., the origin server) and begins receiving the file. While the file is being received, the proxy server streams the file to the first client device without waiting for the file to be fully received at the proxy server. The proxy server streams the file to subsequent requesting client devices while the file is being received without waiting for the file to be fully received at the proxy server and without waiting for a cache lock on the file to expire. Thus, the proxy server can stream the file to multiple client devices.

In an embodiment, the proxy server writes the file to a temporary cache file as it is being received from the other server. This temporary cache file is available to multiple request processes on the proxy server (the other request processes). The proxy server streams the file to the requesting client devices from the temporary cache file. The proxy server stores, in a shared memory structure that is available to each request process, metadata that indicates whether the file is currently being written to the cache. The proxy server stores, in a per-request structure, metadata that indicates the amount of data that is streamed to the requesting client device of that request and a pointer to the temporary cache file.

Thus, instead of the proxy server transmitting an additional request to the origin server for the file or waiting for a cache lock to be unset, the proxy server can stream the file to multiple client devices without waiting for the file to be fully received. This reduces latency to the client device to receive the file and reduces the bandwidth on the origin server and other resources of the origin server.

Figure 1:
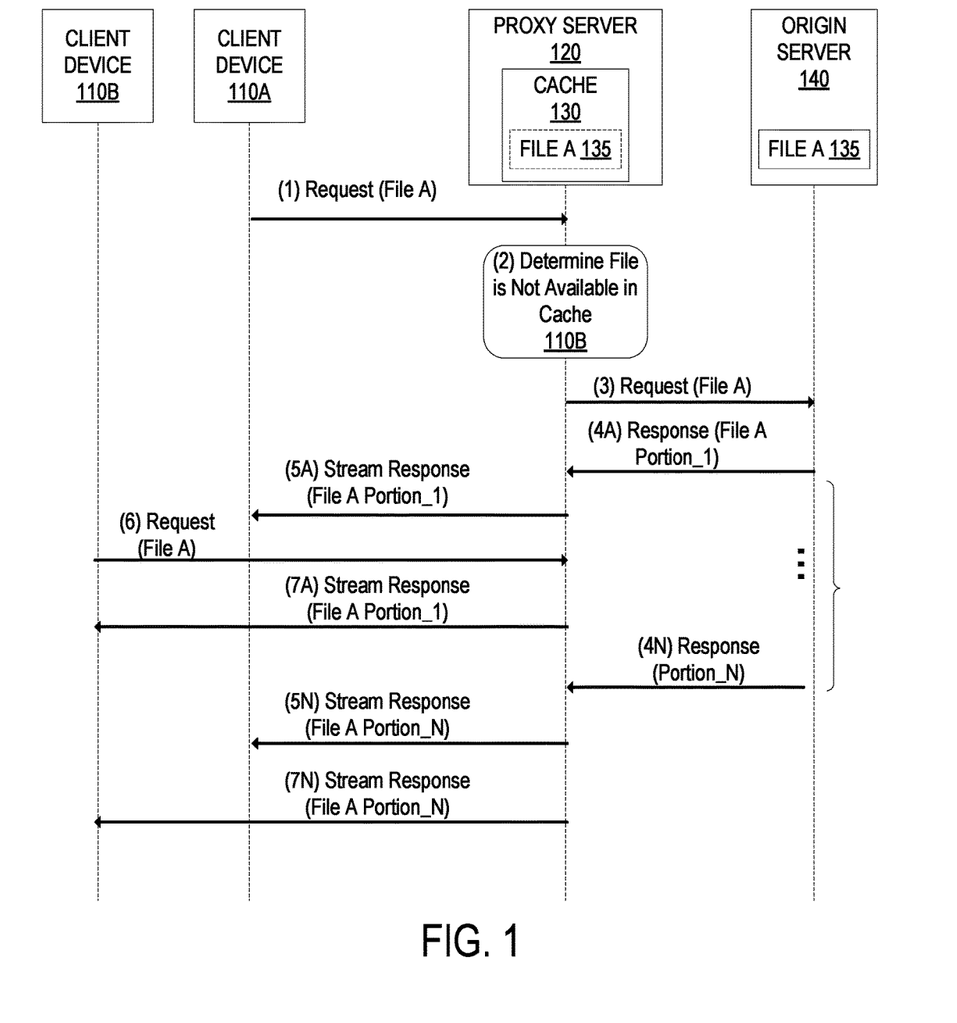
FIG. 1 is a sequence diagram that illustrates exemplary operations for a proxy server streaming a resource to multiple requesting client devices while the resource is being received according to an embodiment.

FIG. 1 is a sequence diagram that illustrates exemplary operations for a proxy server streaming a resource to multiple requesting client devices while the resource is being received at the proxy server according to an embodiment. The sequence diagram includes the client devices 110A and 110B. Each client device 110 is a computing device (e.g., laptop, workstation, smartphone, mobile phone, tablet, gaming system, set top box, wearable device, Internet of Things (IoT) device, etc.) that is capable of transmitting and/or receiving network traffic. Each client device may execute a client network application such as a web browser, native application, or other application that can access network resources (e.g., web pages, images, word processing documents, PDF files, movie files, music files, or other computer files).

The proxy server 120 is a physical server that is configured to stream a resource to multiple requesting client devices as will be described in greater detail herein. The proxy server 120 has a multi-process architecture where each request may be handled by a different process and/or potentially on a different CPU.

Figure 2:
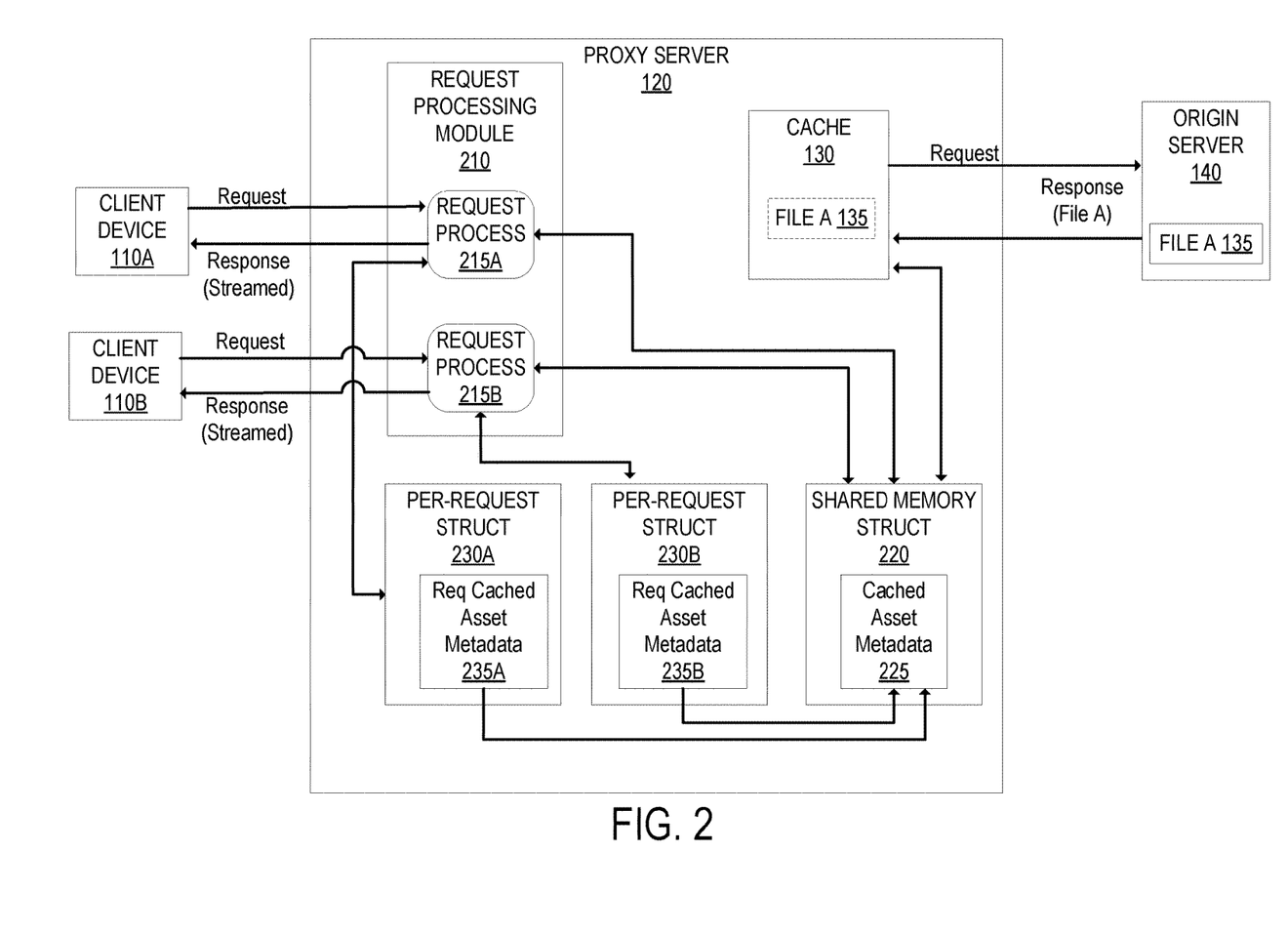
FIG. 2 illustrates an exemplary software architecture of the proxy server 120 for streaming a resource to multiple requesting client devices while the resource is being received according to an embodiment.

FIG. 2 illustrates an exemplary software architecture of the proxy server 120 for streaming a resource to multiple requesting client devices while the resource is being received at the proxy server according to an embodiment. The proxy server 120 includes the request processing module 210 that includes the request process 215A and the request process 215B. The request processing module 210 may be acting as a reverse proxy web server with caching. Each request process 215 processes one or more requests. The request process 215A and request process 215B may be executed on two different CPUs or cores. Although two request processes are illustrated, there may be more request processes being executed on the proxy server 120. Each request process 215 can process multiple requests concurrently.

The proxy server 120 also includes the shared memory structure 220 that is in shared memory that is available to each of the request processes 215A and 215B. The shared memory structure 220 includes cached asset metadata 225 that includes metadata about the cached assets in the cache 130. By way of example, the cached asset metadata 225 includes a number of items including the cache identifier, the time the cached asset will expire, whether the cached item is currently being updated (written to the cache), a max time to receive the download from the origin server, and a temporary cache file name. The temporary cache file name is a temporary file name allocated to the cached request and is updated by the request process that processes the initial cached request and is not available until the first write to the file.

The proxy server 120 also includes the per-request structure 230A and 230B for the cached asset. There is a new structure created for each request processed by the proxy server 120. The per-request structure 230A and 230B includes the request cached asset metadata 235A and 235B respectively. The request cached asset metadata 235A and 235B includes a number of items including a pointer to the temporary cache file and indicating an amount of data remaining to stream for the request.

The cache 130 is available to the proxy server 120. The cache 130 may be included within the proxy server 120 or may be physically separate from the proxy server 120. If physically separate, the cache 130 is available to the proxy server 120 and is typically part of the same colocation site. That is, it is generally faster to retrieve files from the cache 130 instead of from the origin server 140.

Although not illustrated in FIG. 1, the proxy server 120 may be part of a distributed cloud computing network that includes multiple proxy servers that are geographically distributed. The proxy servers may be in different points-of-presences (PoPs). Each PoP may include one or more physical servers (e.g., one or more proxy servers, one or more control servers, one or more DNS servers (e.g., one or more authoritative name servers, one or more proxy DNS servers), and one or more other pieces of network equipment such as router(s), switch(es), and/or hub(s)). Each PoP may be part of a different data center and/or colocation site. The distributed cloud computing network may provide different services for customers (e.g., domain owners or operators) such as protecting against Internet-based threats, performance services (e.g., acting as a content delivery network (CDN) and dynamically caching customer's files closer to visitors, page acceleration/optimization), TCP stack optimizations, and/or other services. Although not illustrated in FIG. 1, there are other physical devices between the proxy server 120 and the client devices such as routers, switches, etc.

The origin server 140, which may be owned or operated directly or indirectly by a third-party to the distributed cloud computing network, is a computing device on which a network resource resides and/or originates (e.g., web pages, images, word processing documents, PDF files movie files, music files, or other computer files).

The proxy server 120 may operate as a reverse proxy and receive request for network resources (e.g., HTTP requests) of a domain of the origin server 140. In an embodiment where the proxy server 120 is one of multiple proxy servers that are part of a distributed cloud computing network, the proxy server 120 may receive a request from a particular client device as determined by the network infrastructure according to an Anycast implementation or by a geographical load balancer. For instance, each of the proxy servers may have a same anycast IP address for a domain of the origin server 140. If the origin server 140 handles the domain "example.com", a DNS request for "example.com" returns an address record having the anycast IP address of the proxy servers. Which one of the proxy servers receives a request from a client device depends on which proxy server is closest to the client device in terms of routing protocol configuration (e.g., Border Gateway Protocol (BGP) configuration) according to an anycast implementation as determined by the network infrastructure (e.g., router (s), switch(es), and/or other network equipment between the requesting client and the proxy servers. In some embodiments, instead of using an anycast mechanism, a geographical load balancer is used to route traffic to the nearest proxy server.

In an embodiment, the proxy server 120 receives a request for a network resource of a domain of the origin server 140 because the DNS record(s) for that domain are changed such that DNS records of hostnames of the domain point to an IP address of the proxy server instead of the origin server 140. In some embodiments, the authoritative name server of the third-party domain is changed to an authoritative name server of the distributed cloud computing network and/or individual DNS records are changed to point to the proxy server 120 (or point to other domain(s) that point to the proxy server 120). For example, the domain owners may change their DNS records to point to a CNAME record that points to the proxy server 120.

At an operation 1, the proxy server 120 receives a request for a file of the origin server 140 from the client device 110A. For instance, the request may be an HTTP/S GET request. In the example of FIG. 1, the request is for the file A 135. The requested file may be relatively large (e.g., greater than 500 MB). The request is processed by a first request process of the proxy server 120. For example, with reference to FIG. 2, the request from the client device 110A is processed by the request process 215A that creates the per-request structure 230A. In an embodiment, the proxy server 120 receives the request because a DNS request for the hostname returns an IP address of the proxy server 120 instead of the origin server 140.

Next, at operation 2, the proxy server 120 determines that the file is not available in the cache 130. For instance, the request process 215A of the proxy server 120 accesses the cached asset metadata 225 in the shared memory structure 220 to determine whether the file is available in the cache 130. For instance, the request process 215A may generate a cache identifier (e.g., a hash of the request URI) that is used as a lookup key into the shared memory structure 220 to determine if the file exists in the cache 130 and has not expired.

Since the file is not available in the cache 130, the proxy server 120 transmits a request for the file to the origin server 140 at operation 3. This request may be an HTTP/S GET request and be similar to the request received in operation 1. In the example of FIG. 1, this request is also for the file A 135. Although FIG. 1 shows the proxy server 120 transmitting the request for the file to the origin server 140, in another embodiment the proxy server 120 transmits the request for the file to a different server (e.g., a different proxy server that may have the file cached).

At operation 4A, the proxy server 120 receives a response from the origin server 140 and begins to receive the file A 135 from the origin server 140. The amount of time necessary to receive the file A 135 from the origin server 140 depends, in part, on the size of the file A 135 and the available transmission bandwidth. If it is a large file (e.g., greater than 500 MB), the file may take several seconds to minutes to be fully received. As the file is being received from the origin server 140, the proxy server 120 begins to write the data of the file in the cache 130. For example, with reference to FIG. 2, the request process 215A writes to the temporary cache file for the file A 135. The temporary cache file may include the data of the file A 135 and may include response headers.

The request process 215A updates the cached asset metadata 225 including indicating that the cached item is currently being updated (being written to the cache). To represent the downloading of the file in FIG. 1, the initial portion of the file A 135 is received at operation 4A and the last portion of the file A 135 is received at operation 4N. When the file is fully received the origin server 140, the temporary cache file may be renamed to its regular cache location.

Instead of waiting for the file A 135 to be fully received at the proxy server 120, the proxy server 120 begins to stream the file A 135 to the requesting client device 110A at operation 5A. The file is streamed from the temporary cache file to the requesting client device 110A. As more data is received from the origin server 140 for the file A 135, the request process 215A continues to write the data of the file to the temporary cache file for the file A 135 and updates the request cached asset metadata 235A indicating the amount of data remaining to stream for the request. To represent the streaming of the file A 135 to the client device 110A, the initial portion of the file A 135 is transmitted to the client device 110A at operation 5A and the last portion of the file A 135 is transmitted to the client device 110A at operation 5N.

While the file is being received from the origin server 140 and being streamed to the client device 110A, the proxy server 120 receives a subsequent request for the file A 135 from the client device 110B at operation 6. There is a possibility that the subsequent request is processed by a different request process of the proxy server 120. In the example of FIG. 2, the request from the client device 110B is processed by the request process 215B that creates the per-request structure 230B.

Instead of transmitting an additional request to the origin server 140 for the file or waiting for the file to be downloaded and/or a cache lock to expire for the file, the proxy server 120 streams the file to client device 110B. Thus, at operation 7A, the proxy server 120 begins to stream the response to the client device 110B. With respect to FIG. 2, the request process 215B streams the file from the temporary cache file to the requesting client device 110B. As the data is streamed to the requesting client device 110B, the request process 215B updates the request cached asset metadata 235 indicating the amount of data remaining to stream for the request. To represent the streaming of the file A 135 to the client device 110B, the initial portion of the file A 135 is transmitted to the client device 110B at operation 7A and the last portion of the file A 135 is transmitted to the client device 110A at operation 7N. Thus, instead of the proxy server 120 transmitting an additional request to the origin server for the file or waiting for a cache lock to be unset, the proxy server can stream the file to multiple client devices without waiting for the file to be fully received. This reduces latency to the client device to receive the file and reduces the bandwidth on the origin server and other resources of the origin server.

Although FIG. 1 illustrates the file being streamed to two client devices while the file is being received from the origin server 140, the file may be streamed to more client devices while the file is being received from the origin server 140.

Although not illustrated in FIG. 1, there is a possibility that the transmission of the requested file from the origin server 140 to the proxy server 120 will fail at some point or will be slower than usual. To protect against this possibility, the proxy server 120 may set a max time for the download of the requested file from the origin server 140 and if that time is reached, the proxy server 120 may try to request the file from the origin server 140 again. In such a case, a different temporary cache file is created and the proxy server 120 begins streaming the file to the client devices from the different temporary cache file.

Figure 3:
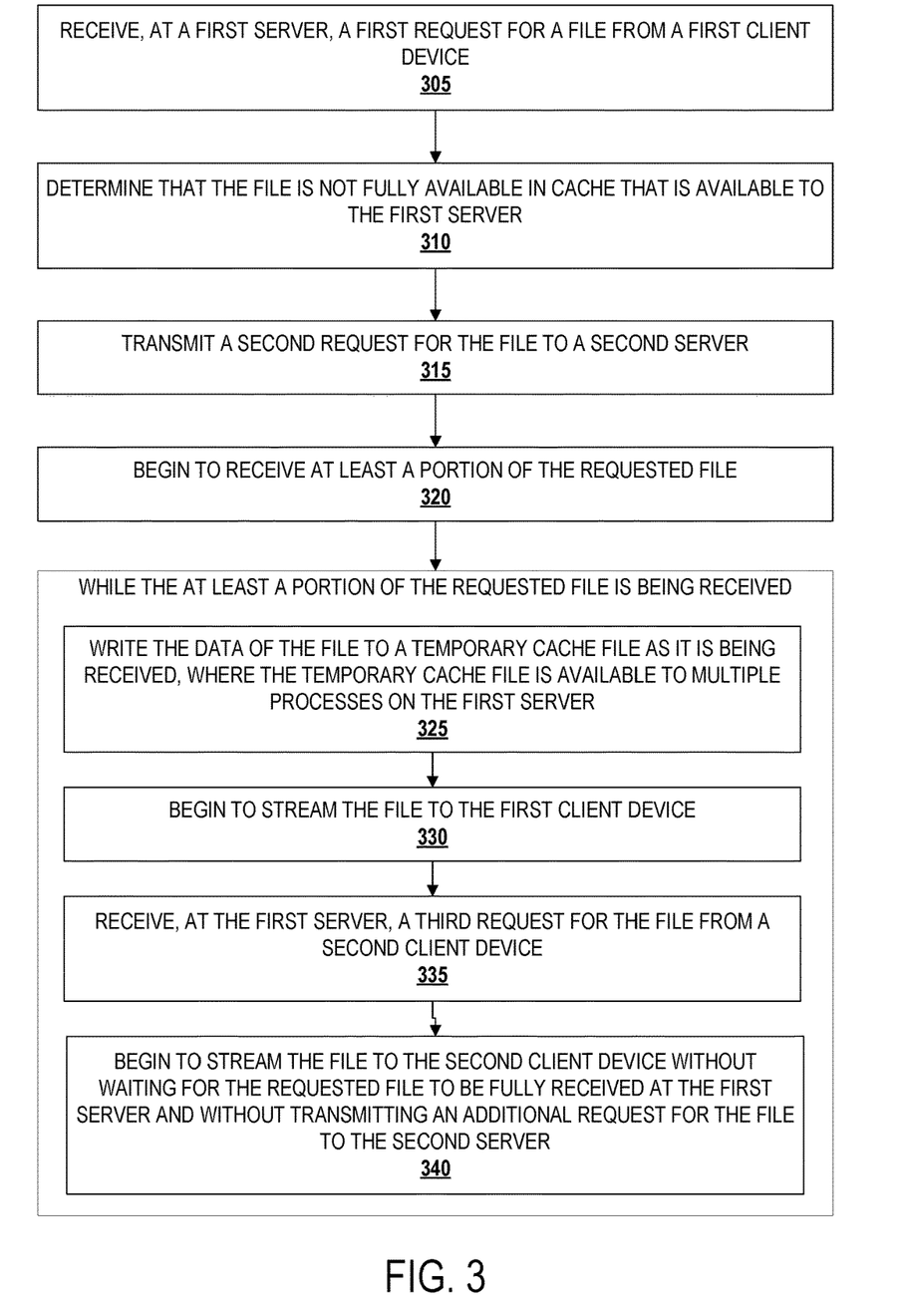
FIG. 3 is a flow diagram that illustrates exemplary operations for a proxy server streaming a resource to multiple requesting client devices while the resource is being received according to an embodiment.

FIG. 3 is a flow diagram that illustrates exemplary operations for a proxy server streaming a resource to multiple requesting client devices while the resource is being received at the proxy server according to an embodiment. The operations of FIG. 3 will be described with respect to HTTP/S request and responses. But, the operations of FIG. 3 can be performed with different types of requests and responses. In an embodiment, the first server referred to in FIG. 3 is the proxy server 120 and the second server referred to in FIG. 3 is the origin server 140.

At operation 305, a first server receives a first request for a file from a first client device. The requested file may be relatively large (e.g., greater than 500 MB). The request may be an HTTP/S request. The request is for a file of a second server (e.g., an origin server). That is, the file does not originate from the first server.

Next, at operation 310, the first server determines that the file is not fully available in a cache that is available to the first server. That is, the file is not cached or not expired. The first server accesses metadata about the cached assets to determine that the file is not available to stream to the first client device.

Since the first server does not have the file available in cache to respond to the request, at operation 315 the first server transmits a request for the file to the second server. The request for the file may be similar to the request received from the first client device. At operation 320, the first server begins to receive at least a portion of the requested file from the second server. While the at least a portion of the requested file is being received from the second server, the operations 325-340 are performed.

At operation 325, the first server writes the data of the file to a temporary cache file as it is being received. The temporary cache file is available, directly or indirectly, to multiple processes processing multiple requests on the first server. The data of the temporary cache file may be used to respond to multiple requests concurrently. The first server may also update, in a shared memory structure that is available to multiple request processes, metadata that indicates that the file is currently being written to the cache.

Next, at operation 330, the first server begins to stream the file to the first client device. The data is streamed from the temporary cache file. The first server streams data of the file to the first client device as more data of the file is received from the second server. The first server may update metadata in a per-request structure that indicates the remaining data of the file to be streamed to the first client device.

Next, at operation 335, the first server receives a third request for the file from a second client device. Without waiting for the requested file to be fully received at the first server and without transmitting an additional request for the file to the second server, the first server begins to stream the file to the second client device at operation 340. The data is streamed from the temporary cache file. The first server may update metadata in a per-request structure that indicates the remaining data of the file to be streamed to the second client device. In an embodiment, a first process of the first server processes the first request including streaming the file to the first client device and a second process of the first server processes the second request including streaming the file to the second client device.

Figure 4:
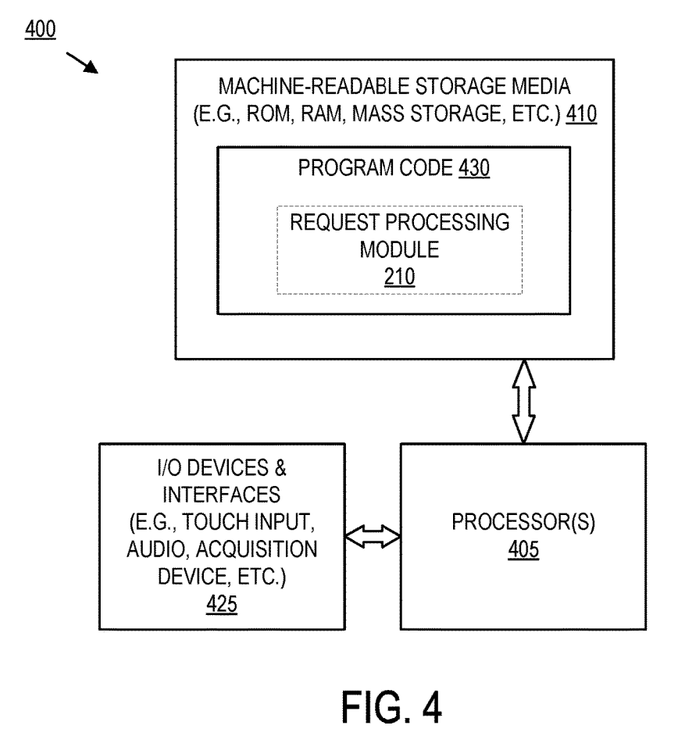
FIG. 4 illustrates a block diagram for an exemplary data processing system 400 that may be used in some embodiments.

FIG. 4 illustrates a block diagram for an exemplary data processing system 400 that may be used in some embodiments. Data processing system 400 includes one or more processors 405 and connected system components (e.g., multiple connected chips). One or more such data processing systems 400 may be utilized to implement the embodiments and operations described with respect to the proxy server, or other electronic device.

The data processing system 400 is an electronic device which stores and transmits (internally and/or with other electronic devices over a network) code (which is composed of software instructions and which is sometimes referred to as computer program code or a computer program) and/or data using machine-readable media (also called computer-readable media), such as machine-readable storage media 410 (e.g., magnetic disks, optical disks, read only memory (ROM), flash memory devices, phase change memory) and machine-readable transmission media (also called a carrier) (e.g., electrical, optical, radio, acoustical or other form of propagated signals—such as carrier waves, infrared signals), which is coupled to the processor(s) 405. For example, the depicted machine-readable storage media 410 may store program code 430 that, when executed by the processor(s) 405, causes the data processing system 400 to execute the request processing module 210.

The data processing system 400 also includes one or more input or output ("I/O") devices and interfaces 425, which are provided to allow a user to provide input to, receive output from, and otherwise transfer data to and from the system. These I/O devices 425 may include a mouse, keypad, keyboard, a touch panel or a multi-touch input panel, camera, frame grabber, optical scanner, an audio input/output subsystem (which may include a microphone and/or a speaker), other known I/O devices or a combination of such I/O devices. The I/O devices and interfaces 425 may include wireless transceivers, such as an IEEE 802.11 transceiver, an infrared transceiver, a Bluetooth transceiver, a wireless cellular telephony transceiver (e.g., 2G, 3G, 4G, 5G), an NFC transceiver, or another wireless protocol to connect the data processing system 400 with another device, external component, or a network and receive stored instructions, data, tokens, etc. For instance, a wired or wireless transceiver may transmit and receive messages to and from the proxy server as described herein.

Additional components, not shown, may also be part of the system 400, and, in certain embodiments, fewer components than that shown in FIG. 4 may also be used in a data processing system 400. One or more buses may be used to interconnect the various components shown in FIG. 4.

Thus, an electronic device (e.g., a proxy server) includes hardware and software, such as a set of one or more processors coupled to one or more machine-readable storage media to store code for execution on the set of processors and/or to store data. For instance, an electronic device may include non-volatile memory containing the code since the non-volatile memory can persist the code even when the electronic device is turned off, and while the electronic device is turned on that part of the code that is to be executed by the processor(s) of that electronic device is copied from the slower non-volatile memory into volatile memory (e.g., dynamic random access memory (DRAM), static random access memory (SRAM)) of that electronic device. Typical electronic devices also include a set or one or more physical network interface(s) to establish network connections (to transmit and/or receive code and/or data using propagating signals) with other electronic devices. One or more parts of an embodiment of the invention may be implemented using different combinations of software, firmware, and/or hardware.

The techniques shown in the figures can be implemented using code and data stored and executed on one or more computing devices (e.g., client device, proxy server, origin server, etc.). Such computing devices store and communicate (internally and/or with other computing devices over a network) code and data using machine-readable media, such as non-transitory machine-readable storage media (e.g., magnetic disks; optical disks; random access memory; read only memory; flash memory devices; phase-change memory) and machine-readable communication media (e.g., electrical, optical, acoustical or other form of propagated signals—such as carrier waves, infrared signals, digital signals, etc.). In addition, such computing devices typically include a set of one or more processors coupled to one or more other components, such as one or more storage devices, user input/output devices (e.g., a keyboard, a touchscreen, and/or a display), and network connections. The coupling of the set of processors and other components is typically through one or more busses and bridges (also termed as bus controllers). The storage device and signals carrying the network traffic respectively represent one or more machine-readable storage media and machine-readable communication media. Thus, the storage device of a given computing device typically stores code and/or data for execution on the set of one or more processors of that computing device. Of course, one or more parts of an embodiment of the invention may be implemented using different combinations of software, firmware, and/or hardware.

In the preceding description, numerous specific details are set forth. However, it is understood that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method, comprising:
   receiving, at a first server, a first request for a file from a first client device;
   determining that the file is not fully available in a cache that is available to the first server;
   transmitting a second request for the file to a second server;
   receiving at least a portion of the requested file; and
   while the at least the portion of the requested file is being received, performing the following:
      writing data of the file to a temporary cache file as it is being received, wherein the temporary cache file is available to multiple processes on the first server;
      streaming the file to the first client device from the temporary cache file;
      receiving, at the first server, a third request for the file from a second client device; and
      streaming the file to the second client device from the temporary cache file without waiting for the requested file to be fully received at the first server and without transmitting an additional request for the file to the second server.

2. The method of claim 1, wherein while the at least the portion of the requested file is being received, further setting a field in a structure that is available to multiple processes on the first server that indicates the file is currently being received from the second server.

3. The method of claim 1, wherein the second server is an origin server for the file.

4. The method of claim 3, wherein the first server is a proxy server that receives the first request because a Domain Name System (DNS) request for a hostname of the file returns an IP address of the proxy server instead of an IP address of the origin server.

5. The method of claim 1, wherein a first request process processes the first request including streaming the file to the first client device, and wherein a second request process processes the third request including streaming the file to the second client device.

6. The method of claim 1, further comprising:
   setting a max time for receiving the requested file;
   determining that the max time for receiving the requested file has been exceeded;
   transmitting a fourth request for the file to the second server;
   receiving at least a portion of the file from the second server in response to the fourth request;
   while the at least the portion of the requested file is being received, writing data of the file to a different temporary cache file as it is being received; and
   streaming the file to the first client device and the second client device from the different temporary cache file.

7. The method of claim 1, wherein the file is a binary file.

8. A non-transitory machine-readable storage medium that stores instructions, that when executed by a processor of a first server, causes said processor to perform operations comprising:
   receiving, at the first server, a first request for a file from a first client device;
   determining that the file is not fully available in a cache that is available to the first server;
   transmitting a second request for the file to a second server;
   receiving at least a portion of the requested file; and
   while the at least the portion of the requested file is being received, performing the following:
      writing data of the file to a temporary cache file as it is being received, wherein the temporary cache file is available to multiple processes on the first server;
      streaming the file to the first client device from the temporary cache file;
      receiving, at the first server, a third request for the file from a second client device; and
      streaming the file to the second client device from the temporary cache file without waiting for the requested file to be fully received at the first server and without transmitting an additional request for the file to the second server.

9. The non-transitory machine-readable storage medium of claim 8, wherein while the at least the portion of the requested file is being received, further setting a field in a structure that is available to multiple processes on the first server that indicates the file is currently being received from the second server.

10. The non-transitory machine-readable storage medium of claim 8, wherein the second server is an origin server for the file.

11. The non-transitory machine-readable storage medium of claim 10, wherein the first server is a proxy server that receives the first request because a Domain Name System (DNS) request for a hostname of the file returns an IP address of the proxy server instead of an IP address of the origin server.

12. The non-transitory machine-readable storage medium of claim 8, wherein a first request process processes the first request including streaming the file to the first client device, and wherein a second request process processes the third request including streaming the file to the second client device.

13. The non-transitory machine-readable storage medium of claim 8, wherein the operations further comprise:
   setting a max time for receiving the requested file;
   determining that the max time for receiving the requested file has been exceeded;
   transmitting a fourth request for the file to the second server;
   receiving at least a portion of the file from the second server in response to the fourth request;
   while the at least the portion of the requested file is being received, writing data of the file to a different temporary cache file as it is being received; and
   streaming the file to the first client device and the second client device from the different temporary cache file.

14. The non-transitory machine-readable storage medium of claim 8, wherein the file is a binary file.

15. A first server, comprising:
   a processor; and
   a non-transitory machine-readable storage medium that provides instructions that, when executed by the processor, causes the first server to perform operations including:
     receive, at the first server, a first request for a file from a first client device;
     determine that the file is not fully available in a cache that is available to the first server;
     transmit a second request for the file to a second server;
     receive at least a portion of the requested file; and
     while the at least the portion of the requested file is being received, perform the following:
       write data of the file to a temporary cache file as it is being received, wherein the temporary cache file is to be available to multiple processes on the first server;
       stream the file to the first client device from the temporary cache file;
       receive, at the first server, a third request for the file from a second client device; and
       stream the file to the second client device from the temporary cache file without waiting for the requested file to be fully received at the first server and without transmitting an additional request for the file to the second server.

16. The first server of claim 15, wherein while the requested file is being received, further set a field in a structure that is to be available to multiple processes on the first server that indicates the file is currently being received from the second server.

17. The first server of claim 15, wherein the second server is an origin server for the file.

18. The first server of claim 17, wherein the first server is a proxy server that receives the first request because a Domain Name System (DNS) request for a hostname of the file returns an IP address of the proxy server instead of an IP address of the origin server.

19. The first server of claim 15, wherein a first request process is to process the first request including streaming the file to the first client device, and wherein a second request process is to process the third request including streaming the file to the second client device.

20. The first server of claim 15, wherein the operations further comprise:
   set a max time for receiving the requested file;
   determine that the max time for receiving the requested file has been exceeded;
   transmit a fourth request for the file to the second server;
   receive at least a portion of the file from the second server in response to the fourth request;
   while the at least the portion of the requested file is being received, write data of the file to a different temporary cache file as it is being received; and
   stream the file to the first client device and the second client device from the different temporary cache file.

21. The first server of claim 15, wherein the file is a binary file.

\* \* \* \* \*